US006871348B1

(12) United States Patent
Cooper (10) Patent No.: US 6,871,348 B1
(45) Date of Patent: Mar. 22, 2005

(54) METHOD AND APPARATUS FOR INTEGRATING THE USER INTERFACES OF MULTIPLE APPLICATIONS INTO ONE APPLICATION

(75) Inventor: Frederick J. Cooper, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/396,709

(22) Filed: Sep. 15, 1999

(51) Int. Cl.$^7$ ............................................... G06F 3/00
(52) U.S. Cl. ....................... 719/310; 719/313; 719/331; 345/718; 345/788; 345/798; 345/800; 345/804
(58) Field of Search .............................. 709/313–317, 709/331; 345/781–866

(56) References Cited

U.S. PATENT DOCUMENTS

| | | | | | |
|---|---|---|---|---|---|
| 5,524,246 | A | * | 6/1996 | Hurley et al. .................. | 713/1 |
| 5,534,887 | A | * | 7/1996 | Bates et al. .................. | 345/802 |
| 5,544,288 | A | * | 8/1996 | Morgan et al. ............. | 345/801 |
| 5,583,761 | A | * | 12/1996 | Chou ......................... | 715/536 |
| 5,819,055 | A | * | 10/1998 | MacLean et al. ........... | 345/798 |
| 5,835,090 | A | * | 11/1998 | Clark et al. .................. | 345/764 |
| 5,872,974 | A | * | 2/1999 | Mezick ....................... | 717/109 |
| 5,903,269 | A | * | 5/1999 | Poreh et al. ................. | 345/804 |
| 5,974,549 | A | * | 10/1999 | Golan ........................ | 713/200 |
| 6,282,701 | B1 | * | 8/2001 | Wygodny et al. ........... | 717/125 |
| 6,340,977 | B1 | * | 1/2002 | Lui et al. .................... | 345/709 |

OTHER PUBLICATIONS

Steel, "Wait call in windows 16 bit/win 32s environment" Apr. 5, 1995; Newsgroups: Comp.os.ms–windows.programmer.misc.*

Truter, "Calling another program" Sept. 26, 1996; Newsgroups: comp.lang.clarion.*

Watts, "How to determine DelphiApp MainWindow handle"; Oct. 13, 1995; Newsgroups:comp.lang.pascal.delphi.misc.*

Margosis, "Spawn a process in a pre–existing window" Feb. 21, 1998; Newsgroups: microsoft.public.vs.language, comp.os.ms–windows.programmer.win32.*

Richter, Jeffrey: "Advanced Windows", Microsoft Press, 1995. pp. 32–37,815–816.*

DiLascia, Paul: "C++ Q&A", Microsoft Systems Journal, Apr. 1997. http://www.microsoft.com/msj/0497/c++/c++ 0497.htm.*

Marsh, Kyle: "Win32 Hooks", MSDN Library, Feb. 1994 http://msdn.microsoft.com/library/en–us/dnwui/html/ msdn_hooks32.asp?frame=true.*

Marsh, Kyle: "Safe Subclassing in Win32", MSDN Library, Jan. 1994 http: msdn.microsoft.com/library/en–us/dnwui/ html/msdn_subclas3.asp?frame=true.*

* cited by examiner

*Primary Examiner*—Meng-Al T. An
*Assistant Examiner*—Phuong N. Hoang
(74) *Attorney, Agent, or Firm*—Blakely, Sokoloff, Taylor & Zafman LLP (57) ABSTRACT

A method including receiving a request to launch a first application and then launching the first application in a suspended mode. Further, installing a message hook in the first application; and unsuspending the first application. Also, an apparatus for performing the above method including a processor and a memory connected to the processor.

21 Claims, 12 Drawing Sheets

METHOD AND APPARATUS FOR INTEGRATING THE USER INTERFACES OF MULTIPLE APPLICATIONS INTO ONE APPLICATION

FIELD OF THE INVENTION

This invention relates to computer user interfaces. Specifically, this invention is directed towards integrating the user interfaces of multiple applications into one application.

DESCRIPTION OF RELATED ART

Currently, with multiple applications running at the same time, window management is often a problem. In addition, transferring the content created in one application into another application is not often easy. Having multiple separate applications for creating and sending documents adds complexity for users.

For example, digital imaging is quickly becoming popular with consumers and professional photographers alike. There are many programs available for capturing digital still images and digital video. In addition, programs are available for converting traditional images (e.g., chemical based photographs) or videos (e.g., analog video tapes) into digital formats suitable for processing by a computer.

Typically, a user would use multiple programs for capturing, manipulating, and outputting any digital media that the user has as each program is optimally suited for a particular phase. However, task flow among multiple image capture and manipulation applications often poses a problem. For example, in order for a user to complete the task of creating and sending an e-mail postcard, the user would have to run a first program to create or capture new videos or still images; another program to edit the video or still images; and a third application to locate existing videos on their hard drive. Finally, the user would have to use a fourth application to build the postcard.

One solution for managing task flow with multiple applications involves creating a suite of applications that, together, provide the necessary functions desired by most users. These solutions provide control over a user's experience. For example, certain elements like an image and video gallery may always be made available. New content (videos, audio, or stills) may be generated at any time, and when it is, may be immediately inserted into the active application without the user having to locate it on their hard drive. Also, integrated solutions provide flow from creation applications (e.g., movie editors) into sending applications (e.g., e-mail programs or web page creators).

Although having an integrated suite of applications provides a unified solution, many users still prefer to use third party applications. For example, a third party still image editor and a third party calendar/card marker may be used to supplement or substitute the functionality provided by the applications in the suite. These additional applications should be integrated into the suite of applications such that the user experience is still relatively consistent and the user is not able to distinguish whether the program that is providing the functionality is part of the original suite of applications or from a third-party application. However, since these additional applications are often commercial, third party applications, the integration would have to be achieved without modifying any code of the third party application.

Thus, it is desirable to be able to integrate separate applications together in a fashion that would provide a more uniform user interface. In addition, it would be desirable to be able to integrate any off-the-shelf applications without modifying the code from these applications.

SUMMARY OF THE INVENTION

The present invention provides a method including receiving a request to launch a first application and then launching the first application in a suspended mode. Further, installing a message hook in the first application; and unsuspending the first application. Also, an apparatus for performing the above method including a processor and a memory connected to the processor.

BRIEF DESCRIPTION OF THE DRAWINGS

The system is illustrated, by way of example and not limitation, in the figures of the accompanying drawings in which like references indicated similar elements and in which.

DETAILED DESCRIPTION

An application referred to as a shell application is used to provide an integrated environment for suite applications and any third-party applications. In one embodiment, the user runs the shell application, and the shell allows the user to choose the task the user wants to complete. When the user makes their task selection, the shell launches the appropriate application using one of two techniques described herein. Both of these techniques cause the launched application to become a part of the shell. With these techniques there is only one application running from the user's perspective. In reality, the shell can be running several different applications at the same time, and present them as dialogs or just different work modes.

There are two different approaches for attaching a process to the shell. The first is for applications designed to be a part of a suite of applications. In this case, special code may be added that allows the separate task application to be fully integrated in the most efficient manner.

In the second approach of attaching an application, the application being attached to the shell is a third party application that is not aware about the shell. Normally, a third party application is not designed to be operated within the context of another application such as the shell application. When the shell application launches the task application, the operating system returns a process identifier (ID) to the launched application. The shell application then creates a operating system hook, which it uses to monitor all messages sent to all applications. The hook specifically watches for window creation messages. For each one of these messages it sees, it examines whether that window is being created for the process it launched, by comparing processes IDs. If so it looks at the style of the window being created to see if it is an application frame window, or some other splash screen. Once the hook locates the launched application's frame window, the attributes of the window are modified. For example, the parent of the window is set to be the shell application's view and the window's style is adjusted to make it a child window. In addition, other styles of the window may be modified.

The shell application also has to do some extra work for the third party application windows. The shell application must set the window size of the task application, and keep the task application's window size updated if the shell's window size changes. It must also size the window in such a way that the frame around the window is clipped by the shell's container window. This helps enforce the feeling to the user that the windows generated are all from one application. The shell application also has to simulate the operating system shutting down to force the task applications to exit. In one embodiment, the messages sent to the task applications are operating system messages that all applications are designed to handle. In this approach, the shell application sends them instead of the operating system, and in this case the operating system is not shutting down, the shell application is indirectly asking the task application to close in a way where it can refuse if it is not able to close at that time.

Although the present invention is described with the use of the shell application in a digital imaging application, the use of integrating applications for digital imaging is just one embodiment. Virtually any suite of separate applications, especially those made from multiple vendors, would benefit from this invention.

Figure 1:
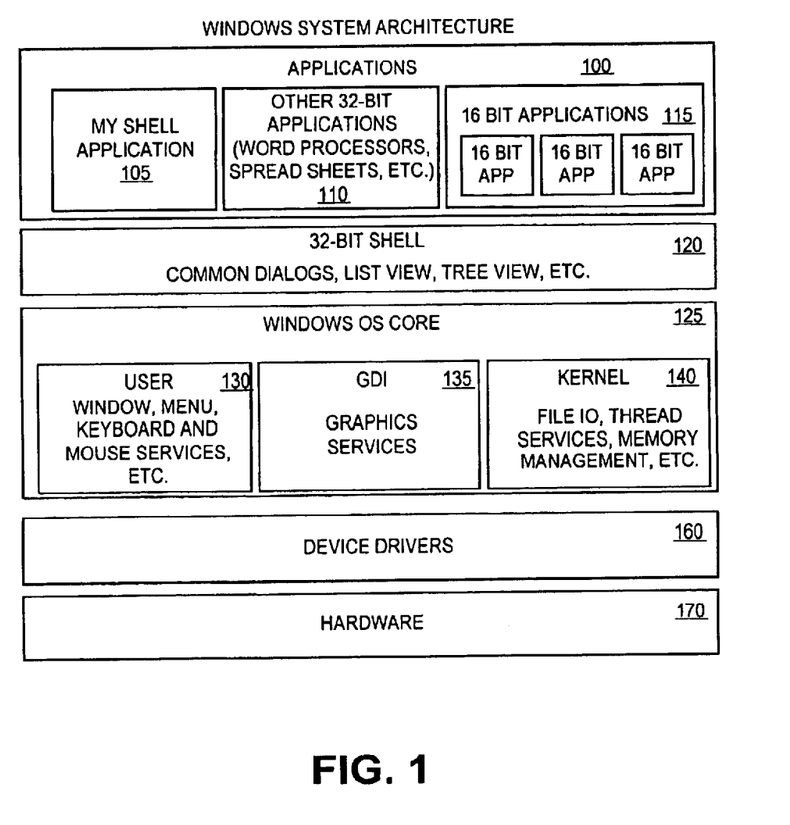
FIG. 1 is a system block diagram of an operating system and associated applications configured in accordance to one embodiment of the present invention.

FIG. 1 is a system diagram illustrating a Microsoft Windows™ operating system architecture and associated applications configured in accordance with one embodiment of the present invention. The architecture includes an applications space 100, a 32-bit shell 120, a Windows operating systems (OS) core 125, a set of device drivers 160, and a set of hardware 170.

Application space 100 contains a shell application 105, a set of 32-bit applications 110, and a set of 16-bit applications 115. Shell application 105 is the shell application that provides the necessary integration between the applications of the system. Shell application 105 is further described herein. Applications space 100 may contain one or more applications (e.g., 32-bit or 16-bit) in addition to shell application 105, which when executed, provide functionality such as word processing, image editing, image capture, and e-mail access. In other embodiments, application space 100 may contain applications of other bit sizes (e.g., 8-bit, 64-bit). Set of 32-bit applications 110 are 32-bit applications running on the system. This includes the applications that are contained within the shell as well as other applications running on the operating system not contained within the shell. Set of 16-bit applications 115 is a set of 16-bit applications running on the operating system. The 16-bit applications are contained together in a combined virtual machine.

The Windows system architecture also contains 32-bit shell 120. 32-bit shell 120 is the operating system's application interface to display high level common controls. For example, 32-bit shell 120 provides interface to display common dialogs (e.g., "Open", "Save", and "Font" dialogs), tree controls, and list views.

Windows OS core 125 provides the operating system's core functionality and includes a USER module 130, a GDI module 135, and a KERNEL 140. USER module 130 is responsible for passing messages around the operating system and for managing windows and other user interface elements. This includes menus, keyboards, the mouse, cursors, and all windows (top level and child). GDI module 135 is the heart of the windows graphics system. GDI module 135 takes care of drawing lines, shapes, and images. In general, GDI module 135 is responsible for displaying the screen to the user. To display a window on the screen requires an intense amount of cooperation between USER module 130 and GDI module 135. KERNEL 140 is the core of the Windows operating system, and is responsible for all the non-user interface tasks. This includes managing memory, threads, and processes, and also managing the file system input and output.

Windows OS core 125 also contains modules such as a virtual machine manager (for managing memory, scheduling processes, and providing MS-DOS protected mode interfaces); an installable file system (IFS) manager (for managing local and networked files systems); and a configuration manager (for managing "plug-and-play" devices).

The Windows system architecture also contains set of device drivers 160, which are software components, usually provided by the manufacture of a particular piece of hardware, that allows the operating system to communicate and make use of the hardware component. A driver is the interface between the operating system and the hardware.

Set of hardware 170 is the set of actual hardware of the computer system. As described below, this includes disk drives, keyboards, mouse, modems, monitors, and printers.

Figure 2:
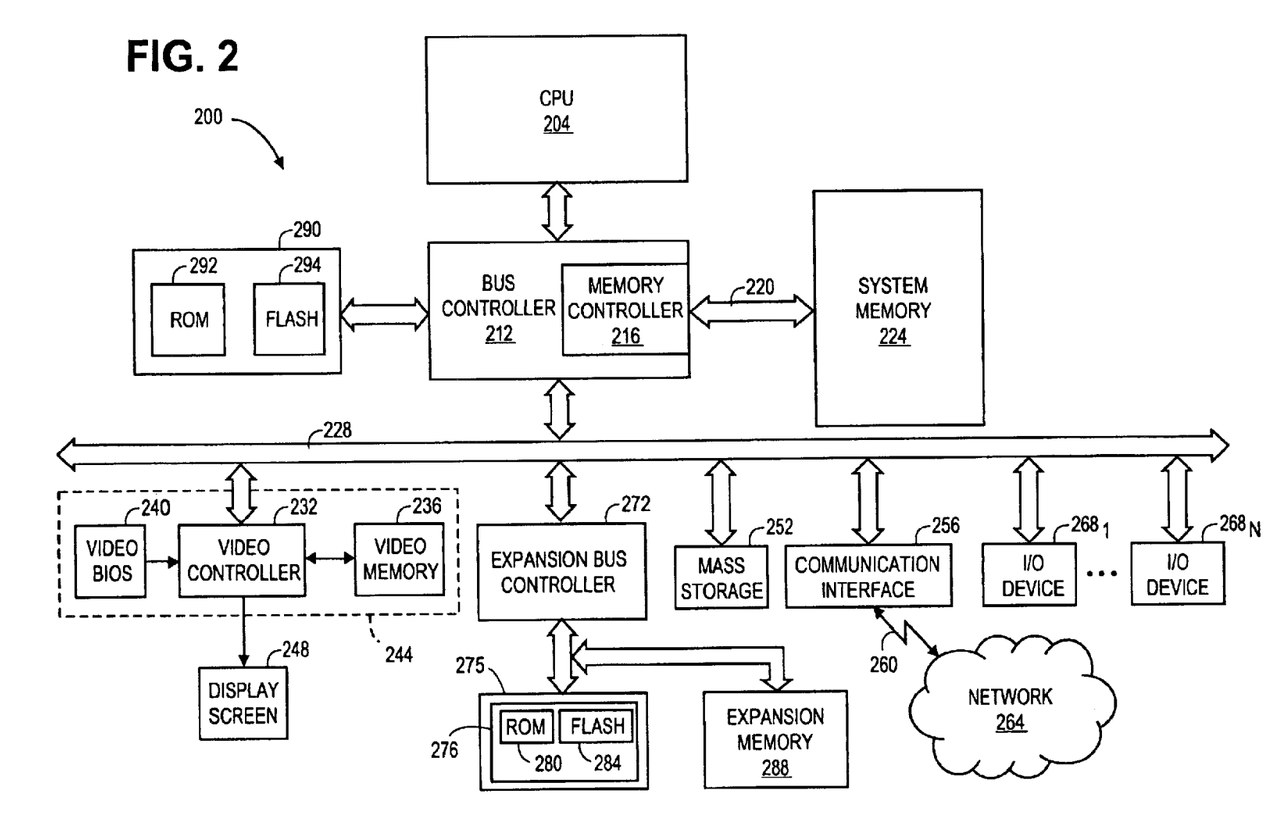
FIG. 2 illustrates an exemplary processor system or user computer system that may implement embodiments of the present invention.

FIG. 2 illustrates an exemplary computer system 200 that implements embodiments of the present invention. The computer system 200 illustrates one embodiment of server 102 and set of clients 106 (FIG. 1), although other embodiments may be readily used.

Referring to FIG. 2, the computer system 200 comprises a processor or a central processing unit (CPU) 204. The illustrated CPU 204 includes an Arithmetic Logic Unit (ALU) for performing computations, a collection of registers for temporary storage of data and instructions, and a control unit for controlling operation for the system 200. In one embodiment, the CPU 204 includes any one of the x86, Pentium™, Pentium II™, Pentium Pro™, and Pentium™ III microprocessors as marketed by Intel™ Corporation, the K-6 microprocessor as marketed by AMD™, or the 6×86MX microprocessor as marketed by Cyrix™ Corp. Further examples include the Alpha™ processor as marketed by Digital Equipment Corporation™, the 680X0 processor as marketed by Motorola™ or the Power PC™ processor as marketed by IBM™. In addition, any of a variety of other processors, including those from Sun Microsystems, MIPS, IBM, Motorola, NEC, Cyrix, AMD, Nexgen and others may be used for implementing CPU 204. The CPU 204 is not limited to microprocessor but may take on other forms such as microcontrollers, digital signal processors, reduced instruction set computers (RISC), application specific integrated circuits, and the like. Although shown with one CPU 204, computer system 200 may alternatively include multiple processing units.

The CPU 204 is coupled to a bus controller 212 by way of a CPU bus 208. The bus controller 212 includes a memory controller 216 integrated therein, though the memory controller 216 may be external to the bus controller 212. The memory controller 216 provides an interface for access by the CPU 204 or other devices to system memory 224 via memory bus 220. In one embodiment, the system memory 224 includes synchronous dynamic random access memory (SDRAM). System memory 224 may optionally include any additional or alternative high speed memory device or memory circuitry. The bus controller 212 is coupled to a system bus 228 that may be a peripheral component interconnect (PCI) bus, Industry Standard Architecture (ISA) bus, etc. Coupled to the system bus 228 are a graphics controller, a graphics engine or a video controller 232, a mass storage device 252, a communication interface device 256, one or more input/output (I/O) devices $268_1$–$268_N$, and an expansion bus controller 272. The video controller 232 is coupled to a video memory 236 (e.g., 8 Megabytes) and video BIOS 240, all of which may be integrated onto a single card or device, as designated by numeral 244. The video memory 236 is used to contain display data for displaying information on the display screen 248, and the video BIOS 240 includes code and video services for controlling the video controller 232. In another embodiment, the video controller 232 is coupled to the CPU 204 through an Advanced Graphics Port (AGP) bus.

The mass storage device 252 includes (but is not limited to) a hard disk, floppy disk, CD-ROM, DVD-ROM, tape, high density floppy, high capacity removable media, low capacity removable media, solid state memory device, and combinations thereof. The communication interface device 256 includes a network card, a modem interface, or a similar communications device for accessing network 264 via communications link 260. In addition, communications interface device 256 includes communication ports such as serial ports (e.g., IEEE RS-232), parallel ports (e.g., IEEE-1284), Universal Serial Bus (USB) ports, and infra-red (IR) ports.

The I/O devices $268$–$268_N$ include a keyboard, mouse, audio/sound card, printer, and the like. The expansion bus controller 272 is coupled to nonvolatile memory 275, which includes system firmware 276. The system firmware 276 includes system BIOS 82, which is for controlling, among other things, hardware devices in the computer system 200. The system firmware 276 also includes ROM 280 and flash (or EEPROM) 284. The expansion bus controller 272 is also coupled to expansion memory 288 having RAM, ROM, and/or flash memory (not shown). The system 200 may additionally include a memory module 290 that is coupled to the bus controller 212. In one embodiment, the memory module 290 comprises a ROM 292 and flash (or EEPROM) 294.

As is familiar to those skilled in the art, the computer system 200 further includes an operating system (OS) and at least one application program, which in one embodiment, are loaded into system memory 224 from mass storage device 252 and launched after POST. The OS may include any type of OS including, but not limited or restricted to, DOS, Windows™ (e.g., Windows 95™, Windows 98™, Windows NT™), Unix, Linux, OS/2, OS/9, Xenix, etc. The operating system is a set of one or more programs which control the computer system's operation and the allocation of resources. The application program is a set of one or more software programs that performs a task desired by the user.

In accordance with the practices of persons skilled in the art of computer programming, the present invention is described below with reference to symbolic representations of operations that are performed by computer system 200, unless indicated otherwise. Such operations are sometimes referred to as being computer-executed. It will be appreciated that operations that are symbolically represented include the manipulation by CPU 204 of electrical signals representing data bits and the maintenance of data bits at memory locations in system memory 224, as well as other processing of signals. The memory locations where data-bits are maintained are physical locations that have particular electrical, magnetic, optical, or organic properties corresponding to the data bits.

When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 3:
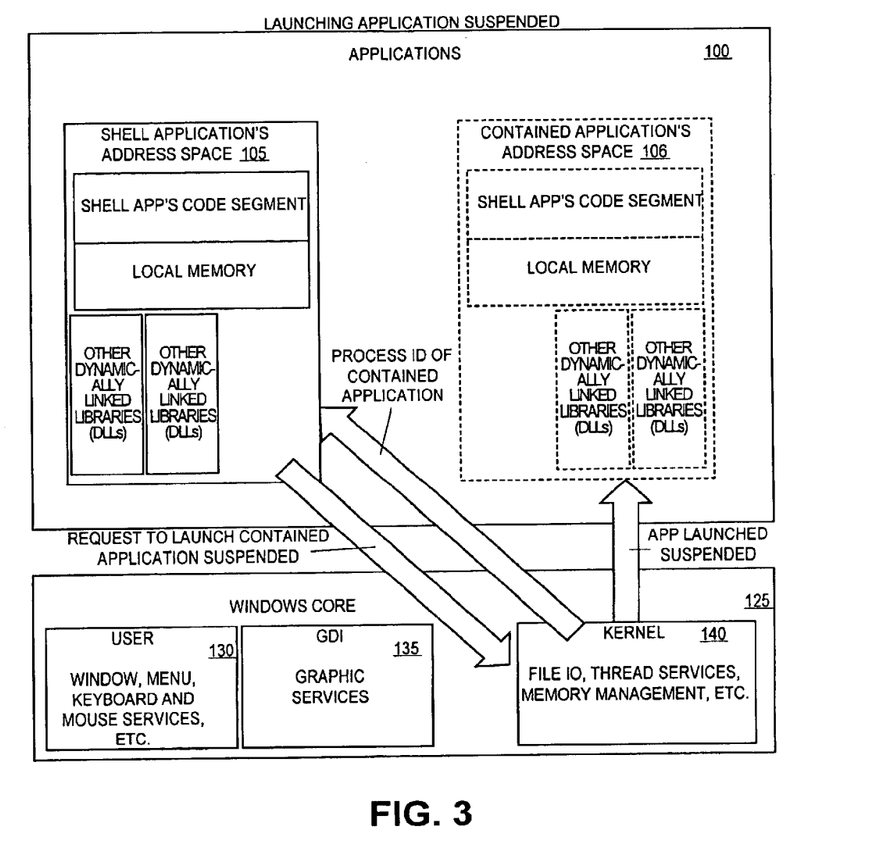
FIG. 3 illustrates the launching of an application in suspended mode in the architecture of FIG. 1 in accordance with one embodiment of the present invention.

FIG. 3 illustrates the launching of a third party application in suspended mode in accordance with one mode of operation of the present. As shown in FIG. 3, shell application 105 makes a request to KERNEL 140 to launch the application that shell application 105 will later contain, a launched application 106. In the description, the "launched application" 106 is also referred to as the "contained application" 106. In the request to KERNEL 140 to launch contained application 106, shell application 105 requests that KERNEL 140 load the contained application 106 in memory, allocate a process space for contained application 106, but not let contained application 106 actually run. This means that contained application 106 is loaded, but in a suspended state. This is done because a shell application's hook dynamically linked library (DLL) 190 needs to be configured with the process ID returned from KERNEL 140 to shell application 105 when contained application 106 is launched. Because multiple applications may simultaneously run on Windows operating systems, and shell application 105 is not aware of the process ID of launched application 106 until the process ID is assigned and returned by KERNEL 140 (when KERNEL 140 launches contained application 106), launched application 106 must be suspended to give shell application 105 enough time to install and configure the hook DLL before contained application 106 begins creating its main window.

Figure 4:
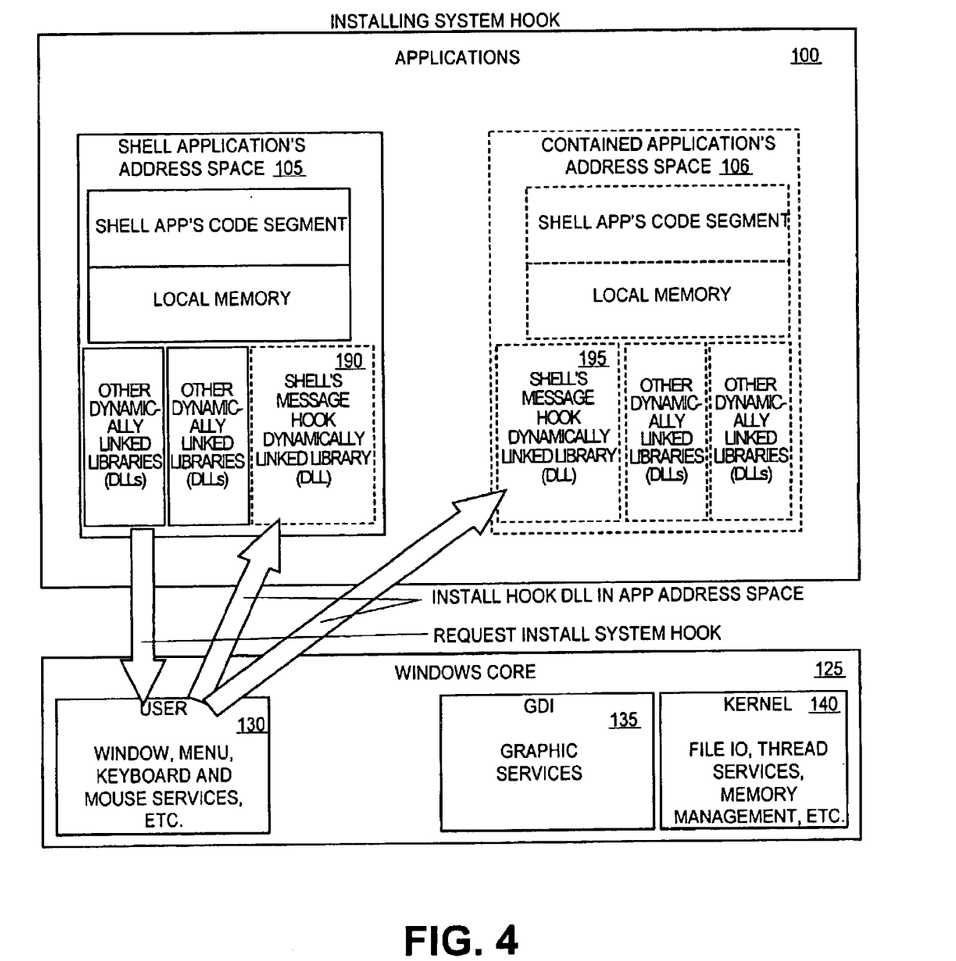
FIG. 4 illustrates the installation of a system hook into the application of FIG. 3 in accordance with one embodiment of the present invention.

FIG. 4 illustrates a message hook 195 being installed in contained application 106. Once contained application 106 is launched in a suspended state, shell application 105 requests USER module 130 to install message hook 195 in all applications of the operating system. USER module 130 actually loads shell application's hook DLL 190 into the process space of every application running on the operating system. In one embodiment, the system hook watches all messages looking for a specific process ID and window styles. The system hook also changes the style of the found window in the process space of the contained application, which by the way you have to be in the process space of a window to change its style so a hook worked really well here. However, it is the operating system that provides the "hook" mechanism that allows the system hook to be installed and watch for messages.

Figure 5:
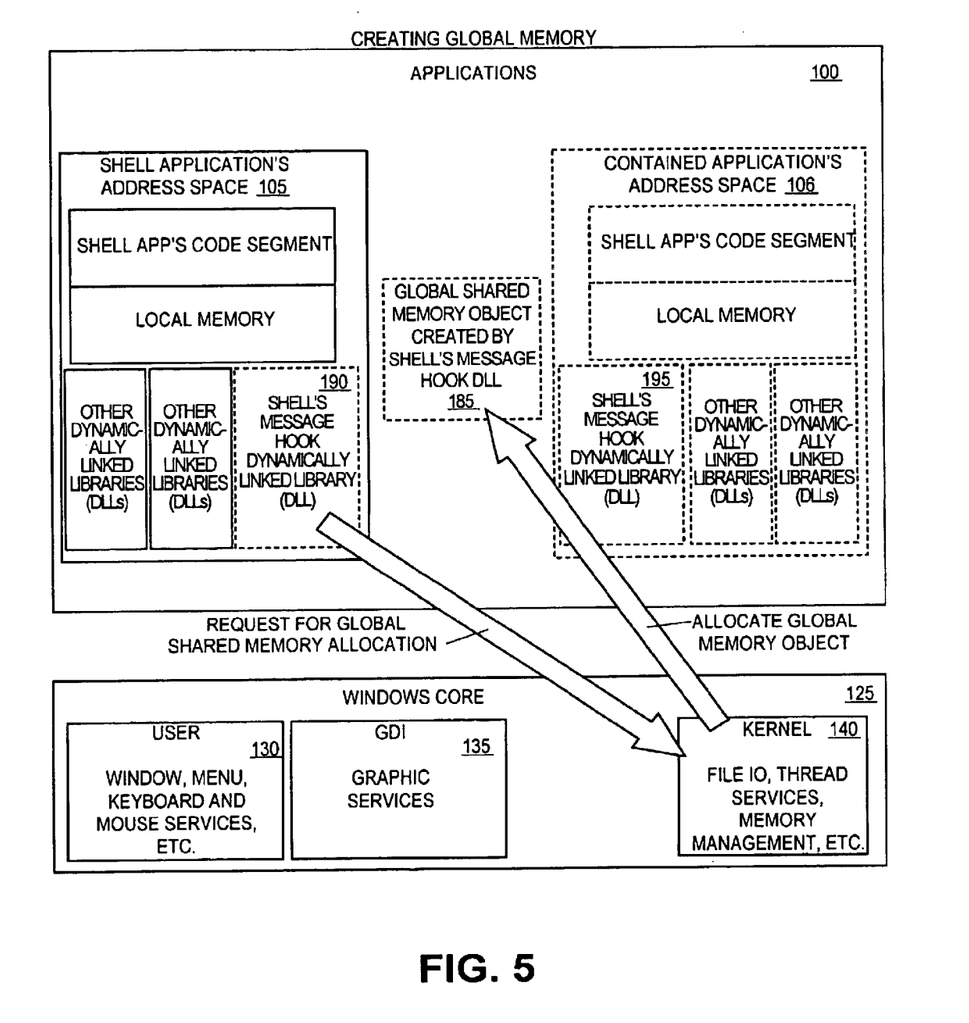
FIG. 5 illustrates the creation of a shared global memory object in the architecture of FIG. 1 in accordance with one embodiment of the present invention.

FIG. 5 illustrates the creation of a shared global memory object 185. Because shell application's hook DLL 190 is running in various process spaces, the only way to communicate with shell application's hook DLL 190 is through globally shared memory object 185, which must be allocated by KERNEL 140. Shell application 105 makes a request to KERNEL 140 to allocate shared global memory object 185. Shared global memory object 185 is a named global memory space in which both shell application 105 and shell application's hook DLL's (e.g., shell application hook DLL 190 and shell application hook DLL 195) are aware of the name of the memory.

Figure 6:
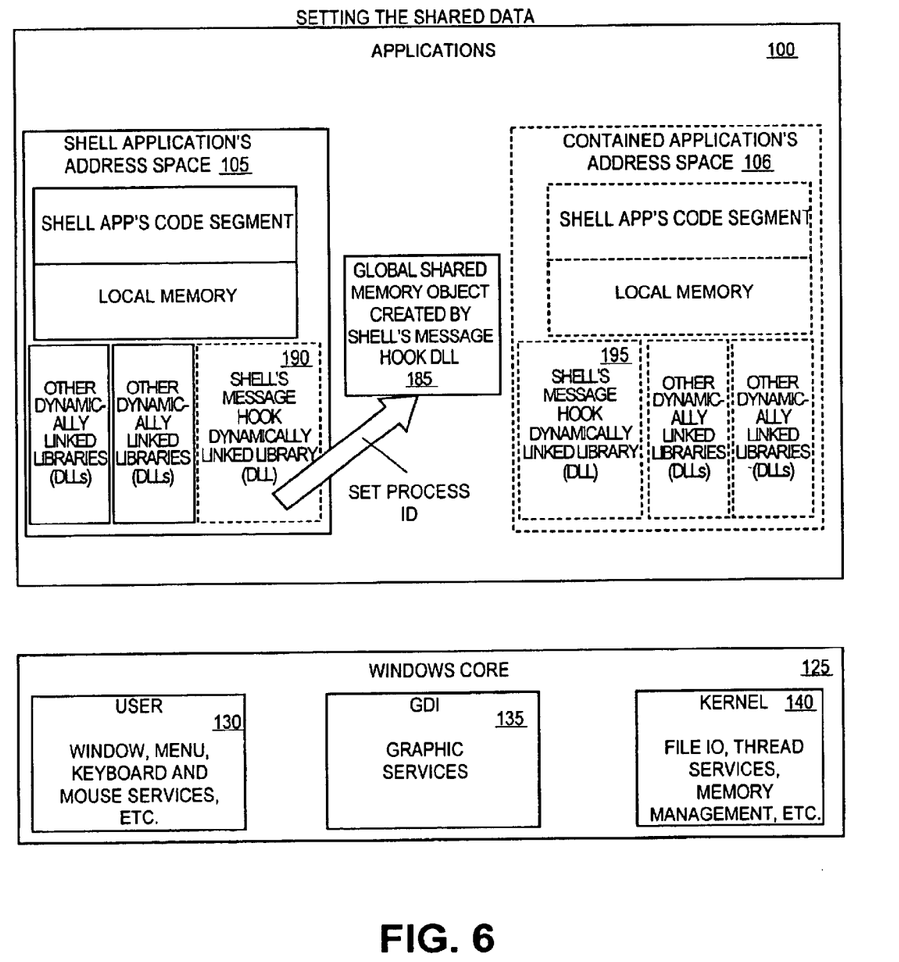
FIG. 6 illustrates the population of the shared global memory object of FIG. 5 with a structure in accordance with one embodiment of the present invention.

FIG. 6 illustrates the population of shared global memory object 185 in accordance with one mode of operation of the present invention. In FIG. 6, shell application 105 populates the memory space of shared global memory object 185 with a structure that includes the process ID of contained application 106.

Figure 7:
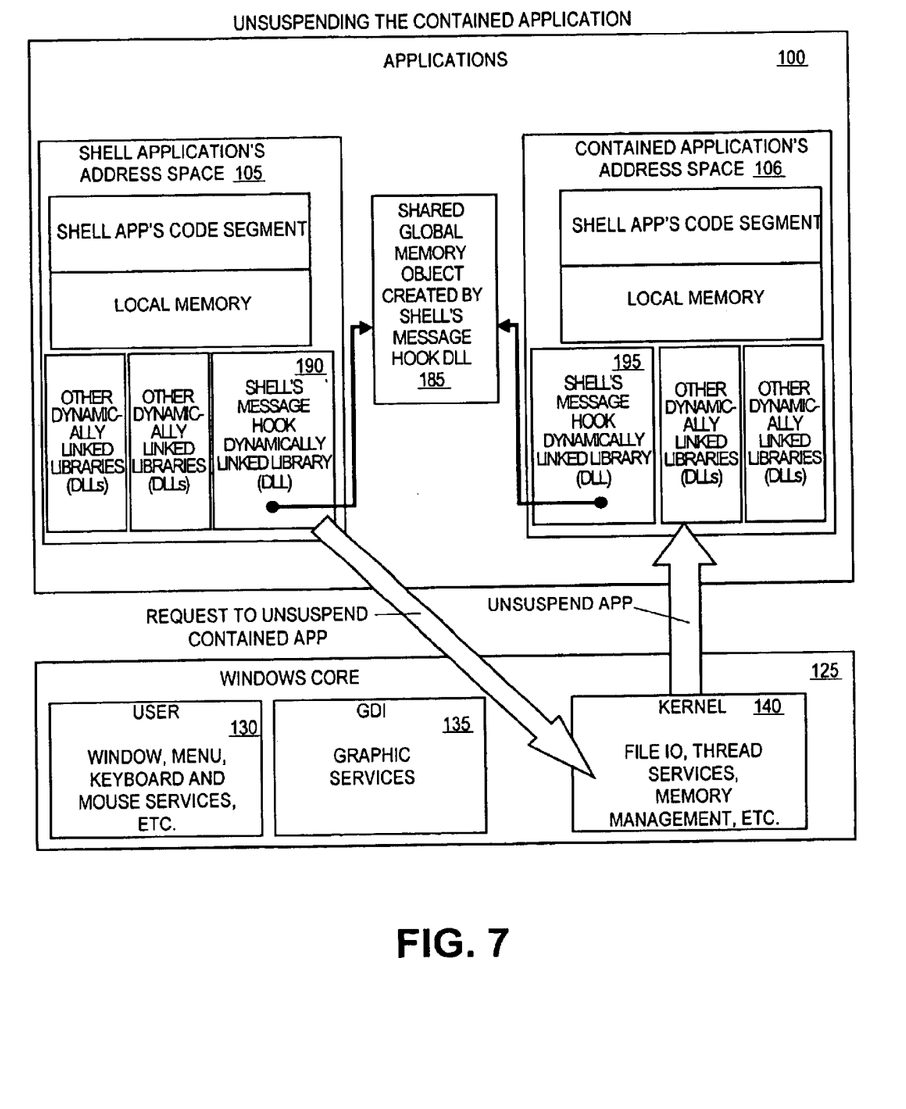
FIG. 7 illustrates the unsuspending of the application of FIG. 3 in accordance with one embodiment of the present invention.

FIG. 7 illustrates the unsuspending of contained application 106 in accordance with one mode of operation of the present invention. Once the memory has been allocated for shared global memory object 185 and shell application's hook DLL's have been installed, shell application 105 requests KERNEL 140 to unsuspend contained application 106 and change contained application 106 to a running state.

During operation, the hooks,.running in each process space, loads the shared data from shared global memory object 185 into the local memory of each process. Each hook then examines all messages sent to any window in the operating system. For each window create (WM_CREATE) message found, the hook will compare the process ID of the window the message was sent to with the process ID retrieved from shared global memory object 185. If the process ID's match, and the window has the title bar (WS_CAPTION) and the dialog frame (WS_DLGFRAME) window styles, the hook adjusts the creation parameters of the window to make it a child of the window specified by shell application 105 (via shared global memory object 185) by setting the parent of the contained window to the window specified by the shell and adding the child window style (WS_CHILD) and removing the free floating window style (WS_POPUP).

In one embodiment, a WS_POPUP style window is a window that floats free on the desktop and the user can move wherever the user wishes. For example, a typical application window has this style. In contrast, a WS_CHILD style window is a window that is contained and constrained by its parent window. Most of these windows are not move able, but a window that has that style does not actually stop the user from moving the window (the WS_CAPTION style does this). However, the child window's position is based on the parent window. For example, if the parent window is moved, then the child window is automatically moved. If the caption style is on the child window, the user can move the child window within the parent's window, but the user cannot move the child window outside of the parent's window. If the parent window is destroyed, the child is also removed. If the user hides the parent window, the child window is also hidden. If the user disables the parent window, the child is also disabled. However, this relationship does not including sizing. The WS_CHILD style and the WS_POPUP style are stylistically and functionally opposite from each other, and a window is not allowed to have both of these styles set at the same time.

The found window's window handle is stored in shared global memory object 185, and the hook sends a message to shell application 105 that a window has been found. Shell application 105 then reads the information for the found window from the shared memory, and disables the hook and frees the global shared memory. Shared global memory object 185 is used only to locate and set-up the main window of contained application 106.

Figure 8:
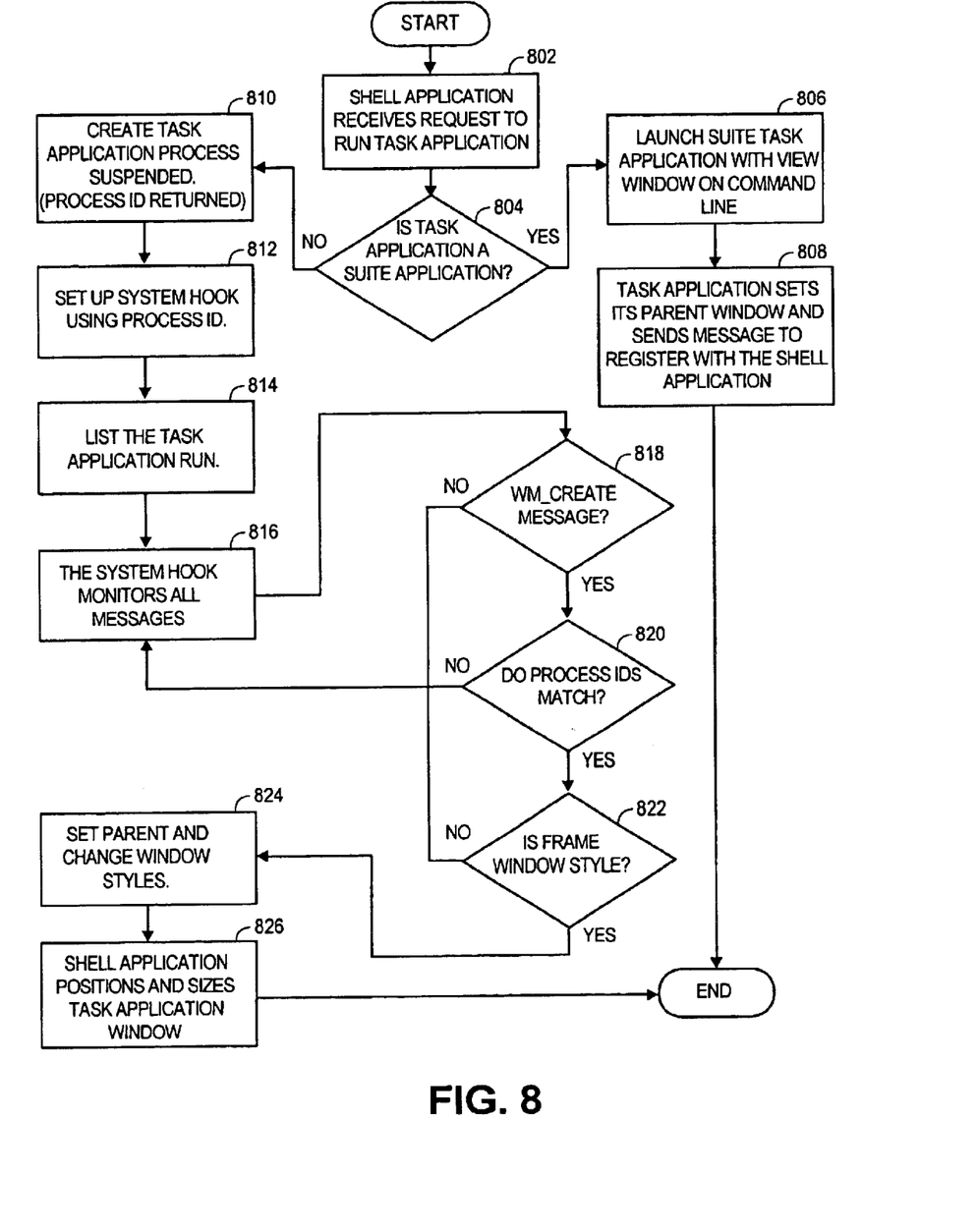
FIG. 8 is a flow diagram illustrating the process of the launching of task applications from within a shell application in accordance to one mode of operation of the present invention.

FIG. 8 is a flow diagram illustrating the launching of a task application from within shell application 105 in accordance with one embodiment of the present invention.

In block 802, shell application 105 receives a request from the user to run a task application. For example, the user may select a button in the tool bar provided by shell application 105 to capture an image.

In block 804, shell application 105 determines if the task application to be run is a suite application—i.e., an application that contains code for integration with shell application 105. If the task application is a suite application, then operation continues with block 806. Otherwise, operation continues with block 810. Thus, the way the task application is initiated and configured falls into two possible scenarios.

In block 806, where the task application is a suite task application, shell application 105 launches the task application with a special command line parameter that contains the handle of the view window of shell application 105. Operation then continues with block 808.

In block 808, when the task application creates its main frame window, the task application uses the handle to the view window of shell application 105 passed on its command line as its parent window. When this switch is provided, the task application also knows to resize its window to be the size of its parent window, and to remove its title bar and window frame. As the application is developed as part of a suite by the developer of shell application 105, a protocol may be established to allow the shell to query the application for information such as types of images or videos that can be transferred from shell application 105, shared menu items that the application supports, hotkeys, and application programming interfaces (APIs) for shutting down the application gracefully.

In block 810, if the task application that is to be launched is not a suite application, as determined in block 804, then shell application 105 creates task application process (e.g., contained application 106) suspended. A process ID for the task application process is returned to shell application 105 as part of the process. At this point, the task application has been initialized, but is not allowed to run.

In block 812, shell application 105 sets up a system hook (e.g., message hook 195 in FIG. 4) in the task application. Shell application 105 uses the process ID obtained in block 810 to set up the system hook. Then, in block 814, the task application is allowed to run. Specifically, the task application is removed from suspended mode.

In block 816, the system hook that is installed in the task application monitors all messages involving the task application, and determines, in block 818, whether a window create message (WM_CREATE) is sent. The WM_CREATE message is the message sent before a window is created. If a WM_CREATE message is detected, shell application 105 examines whether the window that is being created is for the process shell application 105 launched, by comparing process IDs in block 820. If the process IDs match, then operation continues with block 822. If a WM_CREATE message is not detected in block 818 or if the process IDs do not match in block 820, then operation returns to block 816.

Once the process IDs match in block 820, then operation continues with block 822, where the style of the window being created is examined to see if it is an application frame window, or some other splash screen. If the window being created is the task application frame window, then operation continues with block 824, where the system hook sets the parent of the frame window to be shell application 105's view, and modifies the frame window by removing the WS_POPUP style and setting the WS_CHILD style.

In block 826, shell application 105 positions and/or sizes task application window. Specifically, shell application 105 must set the window size of the task application, and keep the task application's window size updated if shell application 105's window size changes. Shell application 105's must also size the task application's window in such a way that the frame around the window is clipped by shell application 105's container window. This helps enforce the feeling to the user that the task application is integrated into shell application 105.

Figure 9:
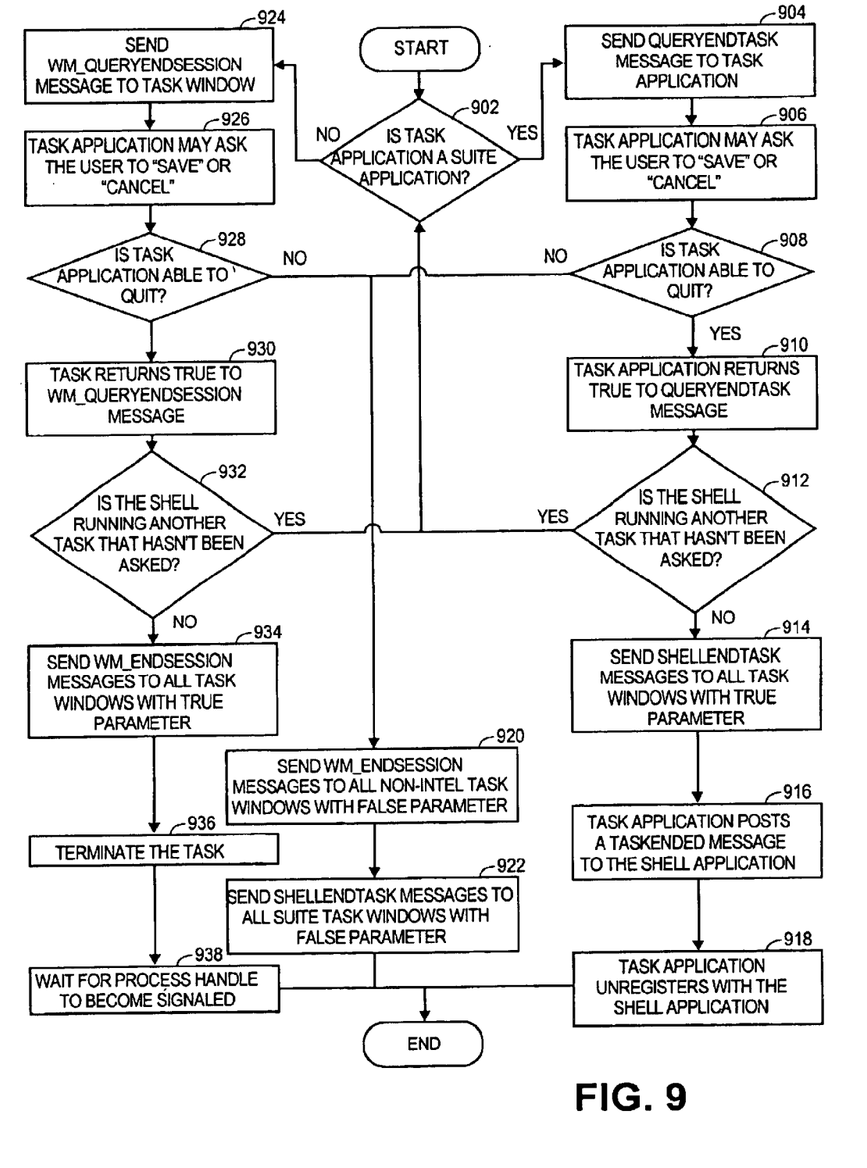
FIG. 9 is a flow diagram illustrating the process of the termination of task applications from within the shell application in accordance to one mode of operation of the present invention.

FIG. 9 is a flow diagram illustrating the termination of shell application 105, including any associated task applications, in accordance with one embodiment of the present invention.

In block 902, shell application 105 determines whether the task application that is being terminated is a suite application. If so, then operation continues with block 904. Otherwise, application continues with block 924.

In block 904, shell application 105 sends a "QueryEndTask" message to the task application. This allows the task application the option of providing the user the ability to save the document, or cancel the termination of the task application. Then, in block 908, it is determined whether the task application is able to terminate. If so, then in block 910, the task application returns a value of "TRUE" to shell application 105 in response to the QueryEndTask message. Operation then continues with block 912, where it is determined whether shell application 105 is running another task application that has not been asked. If not, then operation continues with block 914. Otherwise, operation returns to block 902, where the process begins again for the task application that has not been asked.

In block 914, shell application 105 sends a "ShellEndTask" message to all task windows with a parameter of "TRUE". The task application then posts a "TaskEnded" message to shell application 105 in block 916, and unregisters itself with shell application 105 in block 918.

In block 920, where it is determined in block 908 that the task application is not able to quit, shell application 105 sends a "WM_ENDSESSION" with a "FALSE" parameter to all non-suite task windows. In one embodiment, the WM_ENDSESSION message is typically a message the operating system normally sends to applications when a user chooses to shut down the operating system.

In block 922, shell application 105 also sends a "ShellEndTask" message to each suite task window with a "FALSE" parameter. The messages sent in block 920 and in block 922 inform the task windows that they are not being closed and, in effect, that shell application 105 is not being shut-down.

In block 924, where the task application is not a suite application, shell application 105 sends a "WM_QUERYENDSESSION" message to the task application, which is a message typically sent by the operating system that asks whether the task application may be terminated. Operation then continues with block 926, where the task application may ask whether the user wishes to save any documents before the task application is terminated or cancel the termination request altogether. In one embodiment, the user is asked with a dialog box, which contains a "Cancel" button. If the user presses the Cancel button, the task application returns "FALSE" to the WM_QUERYENDSESSION message and shell application 105 then cancels the termination request and remains running. If the user saves all their documents or decides not to save and does not press the Cancel button, the task application typically returns "TRUE."

In block 928, it is determined whether the task application is able to terminate. If so, then operation continues with block 930. Otherwise, operation continues with block 920, where separate messages are sent to the suite and non-suite applications.

In block 930, where the task application is able to terminate, the task application returns a "TRUE" response to the WM_QUERYENDSESSION message. Operation then continues with block 932, where it is determined if shell application 105 is running another task that has not been queried to see if the task is able to terminate. If shell application 105 is running another task application that hasn't been queried, then operation returns to block 902. Otherwise, operation continues with block 934. In one embodiment, shell application 105 sends the WM_QUERYENDSESSION message to the next task application until all running task application have returned "TRUE." Once that happens, shell application 105 sends the WM_ENDSESSION message and the task application must terminate immediately.

In block 934, if shell application 105 is not running another task that has not been queried, then shell application 105 sends a "WM_ENDSESSION" message to all task windows with a "TRUE" parameter. Then, in block 936, shell application 105 terminates the task application, and, in block 938, waits for process handle to become signaled.

This above is the procedure for shutting down the shell, including all task applications. To terminate a single task application, block 932 and block 912 would be skipped and the procedure would be proceed along the "No" branches for these two blocks.

Figure 10A:
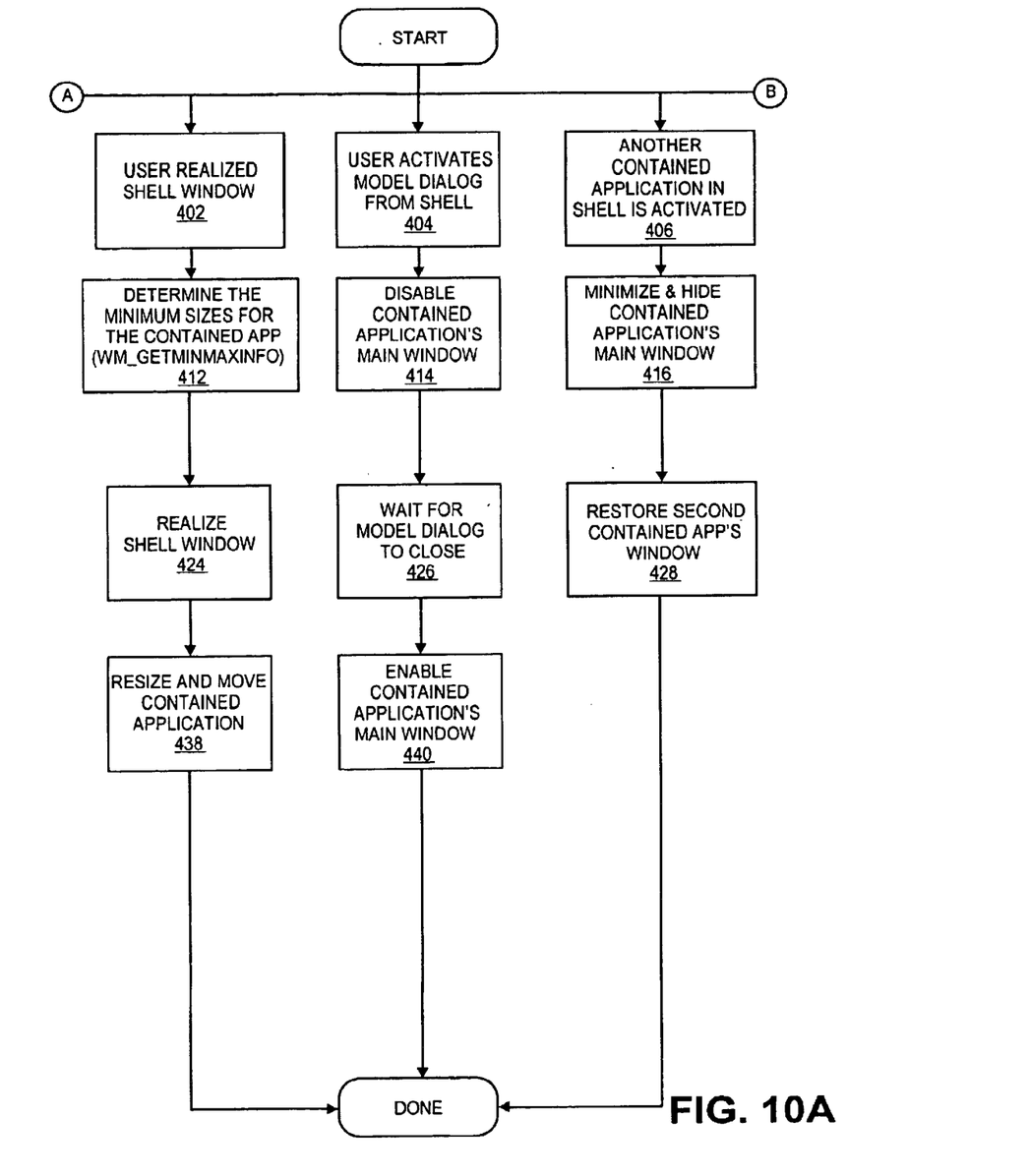
FIGS. 10A–C illustrate flow diagram illustrating the operation of the shell application in accordance to one mode of operation of the present invention.
Figure 10B:
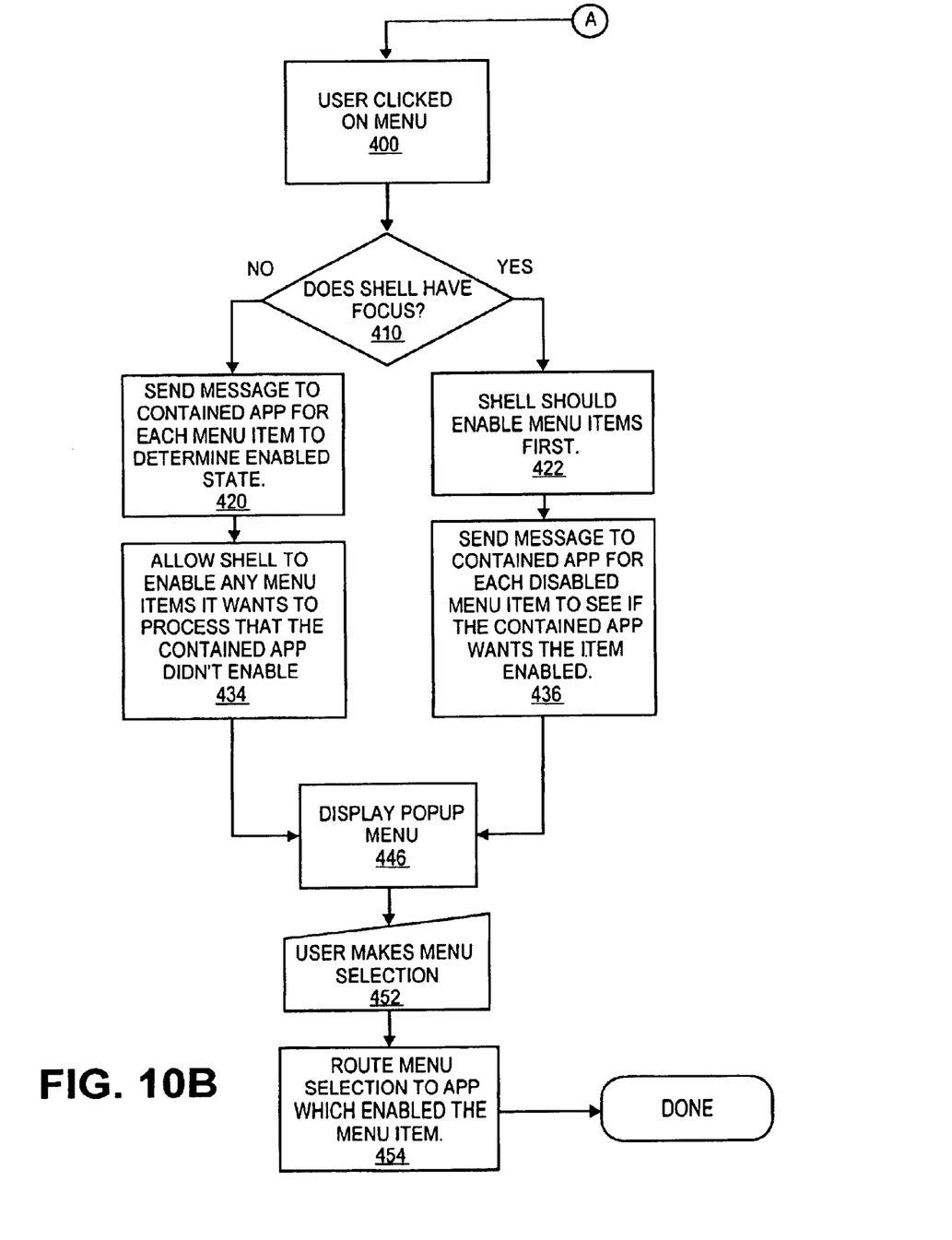
Figure 10C:
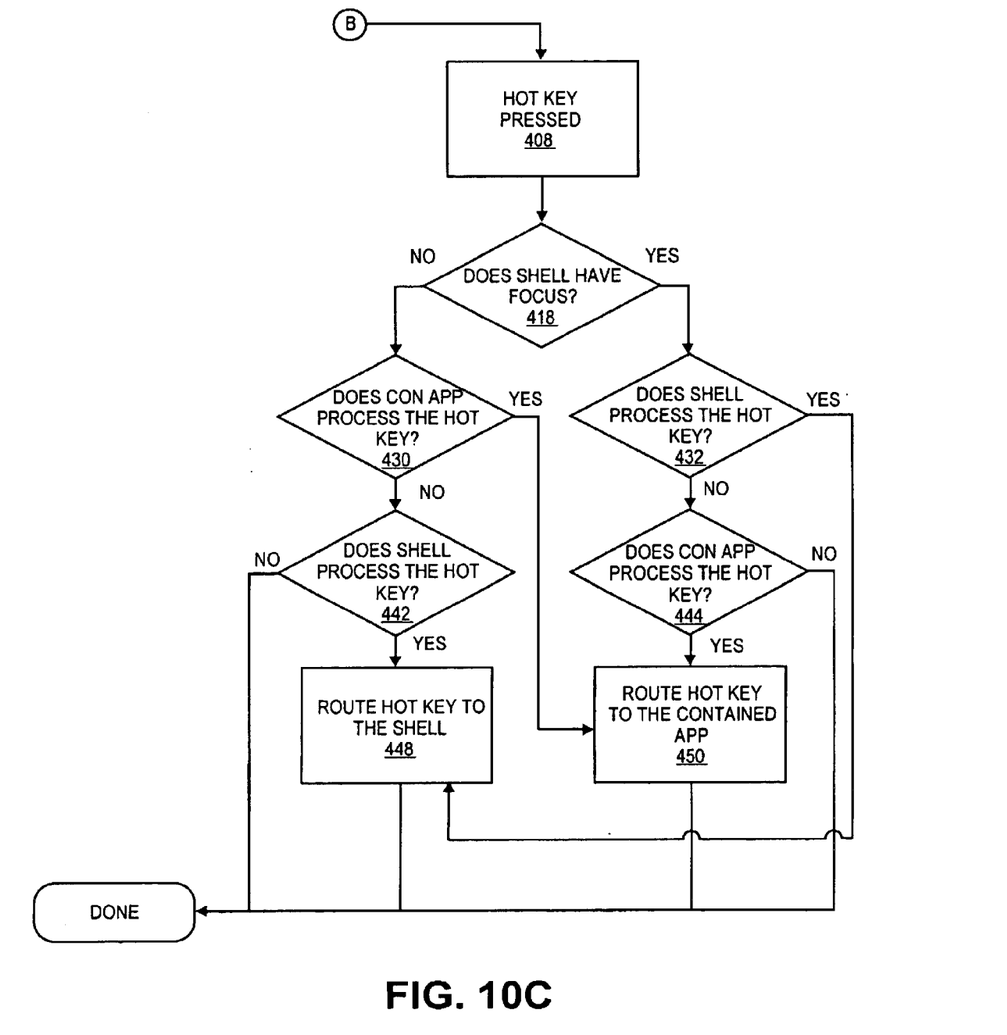

FIGS. 10A–C illustrate flow diagram illustrating the operation of shell application 105 in accordance with one embodiment of the present invention.

In block 400, it is detected by shell application 105 that the user has selected a menu item. Operation then continues with block 410, where shell application 105 determines if it has focus. If shell application 105 has focus, then operation continues with block 422. Otherwise, operation continues with block 420.

In block 420, shell application 105 sends a message to the contained task application for each menu item to query whether the menu item is enabled. Then, in block 434, shell application 105 enables any menu item it needs to process that has not be enabled by the contained task application.

In block 446, a pop-up menu is displayed that contains menu items that have been enabled. Then, in block 452, the user makes a menu selection, which is routed to the application that enabled the menu item in block 454. The menu selection is then processed by the task application.

In blocks 422, where it is determined that shell application 105 has focus, shell application 105 enables menu items first. Then, in block 436, shell application 105 sends a message to the contained task application for each menu item that is disabled to see if the contained task application wants to enable the item. Operation then continue with block 446, which is described above.

Another event that may be received by shell application 105 is that the user may attempt to resize shell application 105's window, as in block 402. Then, in block 412, shell application 105 determines the minimum sizes for the contained task application by sending a query to retrieve the minimum and maximum window sizes for the contained task application (WM_GETMINMAXINFO).

In block 424, shell application 105 resizes its window within the constraints of the minimum and maximum sizes for the contained task application as retrieved from block 412. Once the user has finished resizing shell application 105's window, shell application 105 resizes and move the contained task application as necessary to ensure an aligned view.

In block 404, the user has enabled/activated a modal dialog box or window from shell application 105. When this occurs, shell application 105, in block 414, disables the contained task application's main window such that it will not accept any input. Shell application 105 then waits for the modal dialog to close in block 424, and then re-enables the contained task application's main window in block 440.

In block 406, shell application 105 receives an activation request for another contained application. For example, the user, when satisfied with his edits to an image, activates the e-mail program to e-mail out the image. In block 416, shell application 105 minimizes and hides the current contained application's main window, and, in block 428, restores the second contained application's main window.

In block 408, shell application 105 has detected that a short-cut, or "hot" key has been pressed, for example, the user has selected the hot key for capturing an image. In block 418, it is determined whether shell application 105 has focus. If shell application 105 has focus, operation continues with block 432. Otherwise, operation continues with block 430.

In block 432, where shell application 105 has focus, it is determined whether shell application 105 processes the hot key. If so, operation continues with block 448. Otherwise, operation continues with block 444, where it is determined whether a contained application would process the hot key. The contained task application processes the hot key, but operation continues with block 450. Otherwise, the hot key is ignored.

In block 450, where the contained task application processes the hot key, shell application 105 routes the hot key to the contained task application for processing.

In block 430, where shell application 105 does not have focus, it is determined whether the contained task application processes the hot key. If the contained task application processes the hot key, then operation continues with block 450, where the hot key is routed to the contained task application. Otherwise, operation continues with block 442, where it is determined whether shell application 105 processes the hot key. If shell application 105 processes the hot key, then operation continues with block 448, where the hot key is routed to shell application 105. Otherwise, the hot key is ignored.

Containing applications in a shell eliminates all window management issues for a suite of applications, allowing the user to move, resize, minimize and restore any contained applications as if they were just one application.

The present invention also provides content flow between applications, because shell application 105 is aware of exactly what application on which the user is working. Shell application 105 may coordinate new content creation. So if the user is in an e-mail application, the user can press a "Record Video" button, available in shell application 105, which runs a recorder application. When the user is done, the video is automatically added into the e-mail.

Shell application 105 can also "merge" applications together. For example, for a web camera application, which allows the user to set up a web camera on their web page, asks all the properties for the web camera, and then asks the user if they already have a web camera on their web page. If they don't the shell application tells shell application 105 to swap in the suite web page editor application that then allows the user to edit their web page in the middle of the web camera application. Once the user finishes editing their web page, shell application 105 automatically transitions back to the web camera application that finalizes the web camera setup now that it knows the web page to use.

Having shell application 105 presents common elements and allows certain elements such as an image and video gallery and a new content tool bar to be always available to the user in all applications—including applications that are not written as part of the suite.

Placing common elements such as tool bars and the gallery in shell application 105 means that the task applications do not have to add these common elements themselves. Task applications (e.g., contained application 106) benefit from the features of shell application 105 without having to do the additional work of actually incorporating the controls or code to make that functionality possible. This reduces and localizes code.

Using shell application 105 also allows applications to be sold separately. Since applications are typically developed separately, applications may be debugged by developers as separate components. They may even be sold as stand alone products without common elements such as the gallery and new content creation toolbar.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:

receiving a request to launch a first application;

if the first application is a suite application, launching the first application with a command line parameter containing a window handle; and otherwise, launching the first application in a suspended mode, installing a message hook in the first application, the message hook configured with a process identifier assigned to the first application, and unsuspending the first application once the message hook is installed.

2. The method of claim 1, where the message hook is a dynamically linked library (DLL).

3. The method of claim 1, further comprising:

monitoring messages to detect a create window message;

determining if a process identifier associated with the create window message is equal to the process identifier assigned to the first application; and, if the process identifier associated with the create window message is equal to the process identifier for the first application, modifying the create window message.

4. The method of claim 3, where the create window message is modified by setting the create window message to create a window that is a child window of a predetermined application window.

5. The method of claim 1, further comprising:

receiving a request to exit the first application; and simulating an operating system shutdown to force the first application to exit.

6. The method of claim 1, wherein the window handle identifies a window of a predetermined application to function as a parent window of suite application windows.

7. An article comprising a computer readable medium having instructions stored thereon, which when executed, causes:

receiving a request to launch a first application;

if the first application is a suite application, launching the first application with a command line parameter containing a window handle; and otherwise launching the first application in a suspended mode, installing a message hook in the first application, the message hook configured with a process identifier assigned to the first application, and unsuspending the first application once the message hook is installed.

8. The article of claim 7, where the message hook is a dynamically linked library (DLL).

9. The article of claim 7, where the computer readable medium further having instructions stored thereon, which when executed, causes:

monitoring messages to detect a create window message;

determining if a process identifier associated with the create window message is equal to the process identifier assigned to the first application; and, if the process identifier associated with the create window message is equal to the process identifier for the first application, modifying the create window message.

10. The article of claim 9, where the create window message is modified by setting the create window message to create a window that is a child window of a predetermined application window.

11. The article of claim 7, where the computer readable medium further having instructions stored thereon, which when executed, causes:

receiving a request to exit the first application; and simulating an operating system shutdown to force the first application to exit.

12. The article of claim 7, wherein the window handle identifies a window of a predetermined application to function as a parent window of suite application windows.

13. An apparatus comprising:

a processor;

a memory coupled to the processor configured to cause the processor to:

receive a request to launch a first application;

if the first application is a suite application, launch the first application with a command line parameter containing a window handle; and otherwise, launch the first application in a suspended mode, install a message hook in the first application, the message hook configured with a process identifier assigned to the first application, and unsuspend the first application once the message hook is installed.

14. The apparatus of claim 13, where the message hook is a dynamically linked library (DLL).

15. The apparatus of claim 13, where the memory is further configured to cause the processor to:

monitor messages to detect a create window message;

determine if a process identifier associated with the create window message is equal to the process identifier assigned to the first application; and, if the process identifier associated with the create window message is equal to the process identifier assigned to the first application, modifying the create window message.

16. The apparatus of claim 15, where the create window message is modified by setting the create window message to create a window that is a child window of a predetermined application window.

17. The apparatus of claim 13, where the memory is further configured to cause the processor to:

receiving a request to exit the first application; and simulating an operating system shutdown to force the first application to exit.

18. The apparatus of claim 13, wherein the window handle identifies a window of a predetermined application to function as a parent window of suite application windows.

19. A method computerized comprising:

launching, by a shell application, a selected task application in a suspended mode;

installing, by the shell application, a message hook in the selected task application, the message hook configured with a process identifier assigned to the selected task application;

unsuspending, by the shell application, the selected task application; and modifying attributes of identified windows opened by the selected task application according to the process identifier assigned to the selected task application, the identified windows to function as child windows with a parent of the child windows set to a view window of the shell application.

20. The method of claim 19, wherein modifying further comprises:

setting a window size of task application windows; and updating the task applications window size if a size of the shell application window changes.

21. The method of claim 20, wherein setting the window size further comprises:

sizing the task application window such that a frame around the task application window is clipped by a container window of the shell application.

* * * * *